A. FREEMAN.
PLOW.
APPLICATION FILED JULY 15, 1918.
1,286,983.
Patented Dec. 10, 1918.
2 SHEETS—SHEET 2.
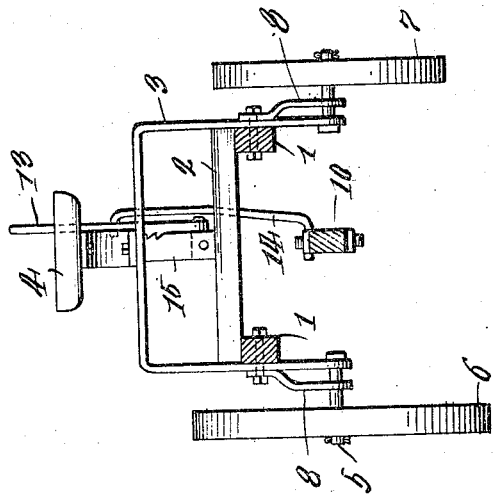
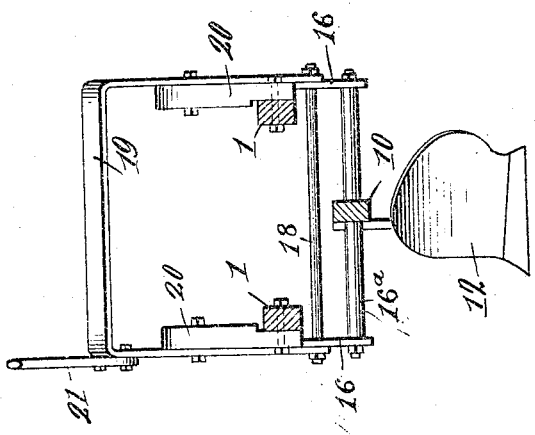
Witnesses
Guy M. Spring
V. B. Hillyard.
Inventor
Andrew Freeman
By Richard B. Owen.
Attorney

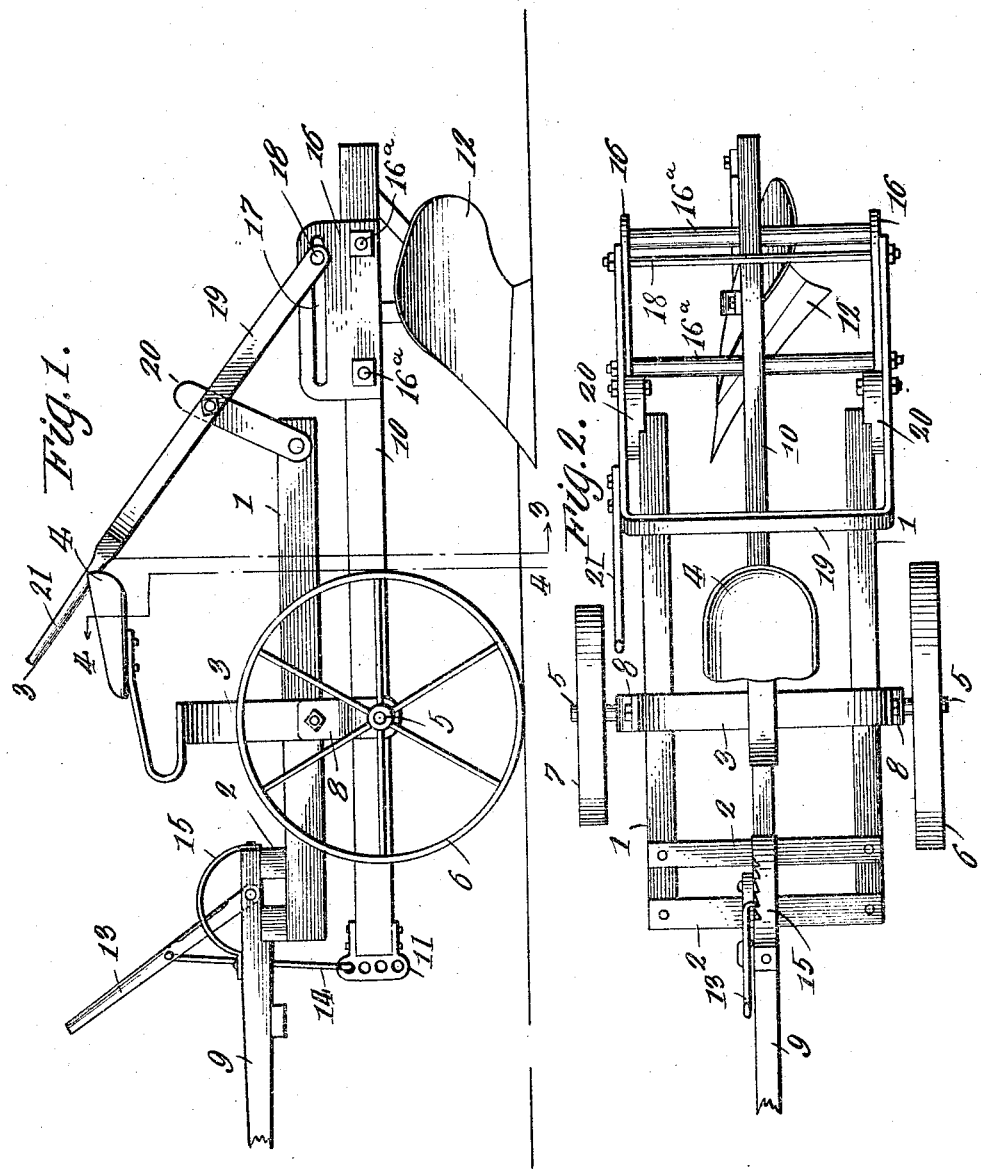

UNITED STATES PATENT OFFICE.

ANDREW FREEMAN, OF BURKETT, NEBRASKA.

PLOW.

1,286,983.

Specification of Letters Patent. Patented Dec. 10, 1918.

Application filed July 15, 1918. Serial No. 245,100.

*To all whom it may concern:*

Be it known that I, ANDREW FREEMAN, a citizen of the United States, residing at Burkett, in the county of Hall and State of Nebraska, have invented certain new and useful Improvements in Plows, of which the following is a specification.

This invention has relation to agricultural implements and more particularly to the type designed for tilling the soil.

The invention is designed to provide a plow which is at all times under control of the driver whereby its depth of operation may be controlled and whereby the plow point may be readily lifted from the ground to enable the plow to be turned when reaching the end of a row or at such times when desirable to have the point clear the ground for any purpose.

The invention furthermore aims to provide a plow which involves a comparatively simple construction, is effective for the purpose designed and readily controllable at the will of the operator to meet varying conditions as to soil and nature of the work in hand.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawings:

Figure 1 is a side view of a plow embodying the invention,

Fig. 2 is a top plan view of the plow,

Fig. 3 is a cross section on the line 3—3 of Fig. 1 looking to the rear as indicated by the arrow, and Fig. 4 is a transverse section on the line 4—4 of Fig. 1 looking to the front as indicated by the arrow.

Corresponding and like parts are referred to in the following description and indicated in the several views of the drawing by like reference characters.

The plow comprises a wheel frame which consists of longitudinal bars 1, transverse bars 2, connecting the bar 1 at their forward ends, and a vertically disposed U-shaped frame 3 which has its vertical members secured to the bars 1 and projecting below said bars a short distance. A seat 4 is connected with the upper cross piece of the frame 3. Axles 5 are secured to the lower ends of the vertical members of the frame 3 and receive ground wheels 6 and 7. Braces 8 are secured at their upper ends to the longitudinal bars 1 and to the vertical members of the U-frame 3. The lower ends of the braces 8 receive the axles 5 thereby strengthening the same and providing ample support therefor. A pole or tongue 9 is secured at its rear end to the transverse bars 2 and is adapted to have the draft applied thereto for drawing the implement over the field.

A plow of any design or make is adapted to be coupled to the wheel frame and as illustrated the plow embodies a beam 10 which is disposed beneath the wheel frame and is provided at its front end with a clevis 11 and at its rear end with a shovel or plow point 12. A lever 13 is mounted upon the rear end of the pole 9 and a link 14 connects it with the front end of the plow beam 10. The clevis 11 is provided with a vertical series of openings in any one of which the lower end of the link 14 is adapted to be attached. A toothed segment or curved bar 15 is secured to the rear end of the pole or tongue 9 and the lever 13 coöperates therewith to hold the front end of the plow 10 at the required elevation or adjusted position.

Plates 16 are secured to the rear end of the plow beam 10 by means of rods 16ª and are formed with longitudinal slots 17 through which a transverse rod 18 passes. An inverted U-shaped frame 19 is pivotally supported intermediate of its ends on standards 20 projecting upwardly from the rear end of the wheel frame. The ends of the side members of the frame 19 support the cross rod 18. A handle 21 is secured to a side member of the frame 19. This handle extends within convenient reach of the driver's seat 4 and enables the rear end of the plow beam 19 and the shovel or plow point 12 to be raised or lowered as may be required.

From the foregoing it is to be understood that any type of plow may be coupled to the wheel frame and when in position the front end thereof may be adjusted vertically by means of the lever 13 and the rear end may be elevated or lowered by means of the frame 19 and handle 21. It is also observed that the plow is not rigidly connected to the wheel frame, hence is adapted to run steady and is not affected by the various vertical and side movements of the wheel frame when the implement is in operation.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

A plow, comprising a main frame, a vertically disposed U-shaped frame connected to the main frame intermediate the ends thereof and having its vertical members depending, wheels at the lower ends of the vertical members of the U frame, a beam disposed beneath the main frame and between the depending members of the U frame, a lever mounted upon the forward end of the main frame and having connection with the front end of the beam for adjusting the latter vertically, longitudinally slotted plates secured to the rear end of the beam, a second lever, a standard pivotally supporting the second lever and having pivotal connection with the rear end of the main frame, and means at the lower end of said second lever and coöperating with the longitudinally slotted plates to pivotally and slidingly connect the lever thereto.

In testimony whereof I affix my signature in presence of two witnesses.

ANDREW FREEMAN.

Witnesses:
CHAS. WASMER,
MAMIE KNIGHT.

Copies of this patent may be obtained for five cents each, by addressing the "Commissioner of Patents, Washington, D. C."